United States Patent
Yoshimura et al.

(10) Patent No.: US 11,578,160 B2
(45) Date of Patent: Feb. 14, 2023

(54) COMPOSITION

(71) Applicant: SUMITOMO CHEMICAL COMPANY, LIMITED, Tokyo (JP)

(72) Inventors: Kazuaki Yoshimura, Ehime (JP); Noriaki Suyasu, Ehime (JP); Masakazu Sumida, Ehime (JP); Shoji Inukai, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 17/486,440

(22) Filed: Sep. 27, 2021

(65) Prior Publication Data
US 2022/0098344 A1     Mar. 31, 2022

(30) Foreign Application Priority Data
Sep. 30, 2020   (JP) .............................. JP2020-164675

(51) Int. Cl.
*C08F 220/14*     (2006.01)
(52) U.S. Cl.
CPC ................................ *C08F 220/14* (2013.01)
(58) Field of Classification Search
CPC .................................................. C08F 220/14
See application file for complete search history.

(56) References Cited

U.S. PATENT DOCUMENTS

| | | |
|---|---|---|
| 4,518,462 A | 5/1985 | Atsushi et al. |
| 5,371,273 A | 12/1994 | Shima et al. |

FOREIGN PATENT DOCUMENTS

| | | |
|---|---|---|
| EP | 0151419 A2 | 8/1985 |
| JP | S58-132002 A | 8/1983 |
| JP | S58-167530 U | 11/1983 |
| JP | S60-180595 A | 9/1985 |
| JP | S62-123150 A | 6/1987 |
| JP | S63-188648 A | 8/1988 |
| JP | H01-47454 B2 | 10/1989 |
| JP | H02-500026 U | 1/1990 |
| JP | H06-11732 B2 | 2/1994 |
| JP | H06-157413 A | 6/1994 |
| JP | H09-67330 A | 3/1997 |
| JP | H11-80077 A | 3/1999 |
| JP | 2003-104939 A | 4/2003 |
| JP | 2005-112722 A | 4/2005 |
| JP | 2006-16339 A | 1/2006 |
| WO | WO88/02359 A1 | 4/1988 |

OTHER PUBLICATIONS

Notice of Reasons for Refusal in JP2020-164675, dated Mar. 3, 2021.
Extended European Search Report dated Jan. 26, 2022 in European Patent Application No. 21189110.6, 7 pages.
Ohno, Hiroyuki, Motoh Mutsuga, and Yoko Kawamura. "Identification and quantitation of volatile organic compounds in poly (methyl methacrylate) kitchen utensils by headspace gas chromatography/mass spectrometry." Journal of AOAC International 97.5 (2014): 1452-1458.
Starink, R. J. "Results of Proficiency Test Methyl Methacrylate (MMA) Contents." Mar. 31 2020, 27 pages.

*Primary Examiner* — Catherine S Branch
(74) *Attorney, Agent, or Firm* — Meunier Carlin & Curfman LLC

(57) ABSTRACT

Provided is a molded body having excellent heat resistance. A composition containing methyl methacrylate, methyl isobutyrate and methyl acrylate, in which a content of methyl methacrylate is 99.5% by mass or more, a concentration of methyl isobutyrate is 20 ppm by mass to 300 ppm by mass, and a concentration of methyl acrylate is 5 ppm by mass to 200 ppm by mass.

8 Claims, No Drawings

COMPOSITION

CROSS-REFERENCE TO RELATED APPLICATIONS

This application is a non-provisional utility U.S. Application, which claims priority to and benefit of Japanese Application serial number 2020-164675, filed Sep. 30, 2020, the contents of which is fully incorporated by reference and made a part hereof.

BACKGROUND OF THE INVENTION

Field of the Invention

The present invention relates to a composition, particularly, a composition containing methyl methacrylate as a main component.

Description of the Related Art

Polymethyl methacrylate (PMMA), a polymer obtained by polymerizing methyl methacrylate, is excellent in transparency and also in weather resistance. This is why polymethyl methacrylate is widely used as a material for members included in, for example, vehicle parts, signage and display devices.

Typical examples of a method of producing methyl methacrylate as a raw material of polymethyl methacrylate include "acetone cyanohydrin (ACH) method" in which acetone and hydrogen cyanide (hydrocyanic acid) are used as raw materials, "C4 direct oxidation" in which isobutylene or tert-butyl alcohol is used as a raw material, and "alpha method" in which ethylene is used as a raw material.

However, any of these methods of producing methyl methacrylate cannot avoid impurities such as by-products from being mixed in the produced reaction product (methyl methacrylate).

Using the produced methyl methacrylate containing impurities, particularly, methyl isobutyrate, for production of polymethyl methacrylate and a molded body thereof may result in property degradation of the obtained polymethyl methacrylate and molded body.

Therefore, conventionally, rigorous purification of the produced methyl methacrylate has been employed to reduce the content of methyl isobutyrate to the extent possible, and various purification methods have been heretofore studied (see JP-B-1-47454).

SUMMARY OF THE INVENTION

However, the purification method according to JP-B-1-47454 requires not only large facilities such as one or more distillation columns and a water separation tank but also extremely complicated and cumbersome processes. Therefore, there is demand for a composition containing methyl methacrylate as a main component which enables production of polymethyl methacrylate having excellent properties such as high heat resistance and production of a molded body of the polymethyl methacrylate without carrying out such a purification method.

As a result of intensive studies to solve the problems, the present inventors have found that the problems can be solved without a rigorous purification method as disclosed in JP-B-1-47454, thereby completing the present invention.

That is, the present invention provides the following [1] to [8].

[1] A composition containing methyl methacrylate, methyl isobutyrate and methyl acrylate, in which
a content of methyl methacrylate is 99.5% by mass or more,
a concentration of methyl isobutyrate is 20 ppm by mass to 300 ppm by mass, and
a concentration of methyl acrylate is 5 ppm by mass to 200 ppm by mass.
[2] The composition according to [1], in which the concentration of methyl isobutyrate is 20 ppm by mass to 140 ppm by mass.
[3] The composition according to [1] or [2], in which the concentration of methyl acrylate is 20 ppm by mass to 200 ppm by mass.
[4] The composition according to any one of [1] to [3], in which a ratio of the concentration of methyl acrylate to the concentration of methyl isobutyrate is 0.1 to 6.0.
[5] The composition according to any one of [1] to [4], in which the composition further contains methyl propionate, and a concentration of methyl propionate is 5 ppm by mass to 200 ppm by mass.
[6] The composition according to [5], in which the concentration of methyl propionate is 20 ppm by mass to 200 ppm by mass.
[7] The composition according to [5] or [6], in which a ratio of the concentration of methyl propionate to the concentration of methyl isobutyrate is 1.0 to 4.0.
[8] A method for producing a polymer, the method including polymerizing the composition according to any one of [1] to [7].

According to the present invention, it is possible to easily provide a low-cost composition that can form a molded body of polymethyl methacrylate having excellent resistance to heat (heat resistance) to which the molded body may be exposed particularly at the time of use.

DETAILED DESCRIPTION OF THE PREFERRED EMBODIMENTS

Hereinafter, an embodiment of the present invention will be described in detail. The present invention is not limited by the following description, and each element according to the embodiment of the present invention can be appropriately changed without departing from the gist of the present invention.

1. Compositions

A composition according to the present embodiment contains methyl methacrylate, methyl isobutyrate and methyl acrylate, in which a content of methyl methacrylate is 99.5% by mass or more, a concentration of methyl isobutyrate is 20 ppm by mass to 300 ppm by mass, and a concentration of methyl acrylate is 5 ppm by mass to 200 ppm by mass.

According to the composition of the present embodiment, it is possible to produce polymethyl methacrylate that particularly has heat resistance and to produce a molded body thereof. Specifically, it is possible to produce polymethyl methacrylate that prevents or suppresses an increase in yellowness index and prevents or suppresses a decrease in light transmittance and to produce a molded body of the polymethyl methacrylate.

Hereinafter, components that may be contained in the composition of the present embodiment will be described in detail.

(1) Methyl Methacrylate

"Methyl methacrylate" herein is substantially free of impurities such as by-products (particularly, methyl isobutyrate). However, the present invention is not limited to the definition on the proviso that the object of the present invention is achieved. In other words, "methyl methacrylate" may contain impurities that cannot be removed by an ordinary purification method or may contain impurities in an amount that cannot be detected by an ordinary detection method.

A method of producing methyl methacrylate to be used as a raw material of the composition of the present embodiment is not particularly limited. Examples of the method of producing methyl methacrylate as a raw material of the present embodiment include the aforementioned methods: ACH method, C4 direct oxidation and alpha method. Methyl methacrylate as a raw material may be produced by any of these methods.

As a raw material of the composition of the present embodiment, in addition to methyl methacrylate produced by any of the production methods, it is possible to use methyl isobutyrate or a mixture of methyl isobutyrate and methyl acrylate (hereinafter referred to as "methyl methacrylate mixture") in an amount that is mixed unavoidably in the composition depending on the production methods.

Methyl methacrylate (or methyl methacrylate mixture) that is to be used as a raw material of the composition of the present embodiment and is produced by any of the above production methods may be purified by any conventionally-known suitable purification method.

The methyl methacrylate mixture as a raw material of the composition of the present embodiment may contain methyl isobutyrate in an amount of more than 0 ppm by mass and 300 ppm by mass or less and/or methyl acrylate in an amount of 0 ppm by mass to 200 ppm by mass, considering that the total amount of the methyl methacrylate mixture is 100 parts by mass.

(2) Methyl Isobutyrate

In addition to methyl isobutyrate that is produced by any of the methods of producing methyl methacrylate and is mixed in the composition unavoidably, it is possible to use methyl isobutyrate separately produced by any conventionally-known suitable production method particularly from a viewpoint of adjusting the content of methyl isobutyrate in the composition.

Examples of the method of producing methyl isobutyrate include esterification of isobutyramide to obtain methyl isobutyrate, methoxycarbonylation of propylene to obtain methyl isobutyrate, and methyl-esterification of isobutyric acid to obtain methyl isobutyrate.

"Methyl isobutyrate" herein is substantially free of impurities such as by-products. However, the present invention is not limited to the definition on the proviso that the object of the present invention is achieved. In other words, particularly, "methyl isobutyrate" to be added to the composition may contain impurities that cannot be removed by an ordinary purification method or may contain impurities in an amount that cannot be detected by an ordinary detection method.

It is possible to use methyl isobutyrate commercially available as a reagent or the like.

In the composition of the present embodiment, the concentration of methyl isobutyrate is 20 ppm by mass to 300 ppm by mass.

In the composition of the present embodiment, the concentration of methyl isobutyrate is preferably, 20 ppm by mass to 140 ppm by mass, and more preferably, 40 ppm by mass to 120 ppm by mass.

(3) Methyl Acrylate

In addition to methyl acrylate that is produced by any of the methods of producing methyl methacrylate and is mixed in the composition unavoidably, it is possible to use methyl acrylate separately produced by any conventionally-known suitable production method.

Examples of the method of producing methyl acrylate include methoxycarbonylation of acetylene to obtain methyl acrylate, alcoholysis of acrylonitrile to obtain methyl acrylate, and methyl-esterification of acrylic acid to obtain methyl acrylate.

It is possible to use methyl acrylate commercially available as a reagent or the like.

"Methyl acrylate" herein is substantially free of impurities such as by-products. However, the present invention is not limited to the definition on the proviso that the object of the present invention is achieved. In other words, particularly, "methyl acrylate" to be added to the composition may contain impurities that cannot be removed by an ordinary purification method or may contain impurities in an amount that cannot be detected by an ordinary detection method.

The concentration of methyl acrylate to be contained in the composition of the present embodiment is 5 ppm by mass to 200 ppm by mass.

In the composition of the present embodiment, the concentration of methyl acrylate is preferably, 20 ppm by mass to 200 ppm by mass, and more preferably, 50 ppm by mass to 160 ppm by mass.

According to the composition of the present embodiment which contains methyl acrylate at the above concentration, even when the composition contains methyl isobutyrate, it is possible to improve heat resistance of polymethyl methacrylate and a molded body thereof produced using the composition of the present embodiment. Specifically, it is possible to prevent or suppress a time-dependent increase in yellowness index due to use of the produced polymethyl methacrylate and the molded body thereof. Furthermore, a decrease in light transmittance can be prevented or suppressed.

(4) Methyl Propionate

The composition of the present embodiment may further contain methyl propionate in addition to the aforementioned methyl methacrylate, methyl isobutyrate and methyl acrylate.

In addition to methyl propionate that is produced by any of the methods of producing methyl methacrylate and is mixed in the composition unavoidably, it is possible to use methyl propionate separately produced by any conventionally-known suitable production method.

Examples of the method of producing methyl propionate include methoxycarbonylation of ethylene to obtain methyl propionate and methyl-esterification of propionic acid to obtain methyl propionate.

It is possible to use methyl propionate commercially available as a reagent or the like.

"Methyl propionate" herein is substantially free of impurities such as by-products. However, the present invention is not limited to the definition on the proviso that the object of the present invention is achieved. In other words, particularly, "methyl propionate" to be added to the composition may contain impurities that cannot be removed by an ordinary purification method or may contain impurities in an amount that cannot be detected by an ordinary detection method.

The concentration of methyl propionate to be contained in the composition of the present embodiment is 5 ppm by mass to 200 ppm by mass.

In the composition of the present embodiment, the concentration of methyl propionate is preferably, 20 ppm by mass to 200 ppm by mass, and more preferably, 50 ppm by mass to 100 ppm by mass.

According to the composition of the present embodiment which further contains methyl propionate at the above concentration, even when the composition contains methyl isobutyrate, it is possible to improve heat resistance of polymethyl methacrylate and a molded body thereof produced using the composition of the present embodiment. Specifically, it is possible to more efficiently prevent or suppress a time-dependent increase in yellowness index due to use of the produced polymethyl methacrylate and the molded body thereof. Furthermore, a decrease in light transmittance or prevented or suppressed more efficiently.

(5) Other Components

On the proviso that the object of the present invention is achieved, in addition to the aforementioned methyl methacrylate, methyl isobutyrate, methyl acrylate, and methyl propionate, the composition of the present embodiment may contain other components such as a release agent, a polymerization modifier, a polymerization initiator, an ultraviolet absorber, and a colorant which may be added to form a molded body with predetermined properties.

Hereinafter described are other components which may be contained in the composition of the present embodiment.

(i) Mold Release Agent

In production of polymethyl methacrylate using the composition of the present embodiment and production of a molded body of the polymethyl methacrylate, the composition of the present embodiment may contain a mold release agent, particularly, a mold release agent for improving releasability of the molded body.

Examples of the release agent which may be contained in the composition of the present embodiment include higher fatty acid esters, higher aliphatic alcohols, higher fatty acids, higher fatty acid amides, higher fatty acid metal salts and fatty acid derivatives.

Specific examples of the release agent which may be contained in the composition of the present embodiment include sodium di-(2-ethylhexyl) sulfosuccinate, stearyl alcohol, methyl stearate and stearic acid amide. In the composition of the present embodiment, these examples of the release agent may be used singly, or in combination of two or more kinds thereof.

The content of mold release agent in the composition of the present embodiment is, for example, 0.01 parts by mass to 1.0 parts by mass when the total amount of the composition is 100 parts by mass.

(ii) Polymerization Modifier

The composition of the present embodiment may contain a polymerization modifier that adjusts a polymerization rate in a polymerization reaction.

As the polymerization modifier which may be contained in the composition of the present embodiment, it is possible to employ any conventionally-known suitable polymerization modifier. Examples of the polymerization modifier include compounds that adjust a polymerization rate so as to reduce the rate.

Specific preferred examples of the polymerization modifier include mercaptan compounds such as n-butyl mercaptan and n-octyl mercaptan; terpenoid compounds such as limonene, myrcene, α-terpinene, β-terpinene, γ-terpinene, terpinolene, β-pinene and α-pinene; and α-methylstyrene dimer. Preferably, the polymerization modifier is terpinolene which is a terpenoid compound.

In the composition of the present embodiment, these examples of the polymerization modifier may be used singly, or in combination of two or more kinds thereof.

The content of polymerization modifier in the composition of the present embodiment is, for example, 0.001 parts by mass to 0.5 parts by mass when the total amount of the composition is 100 parts by mass.

(iii) Polymerization Initiator

Examples of the polymerization initiator which may be contained in the composition of the present embodiment include a radical polymerization initiator, a diacyl peroxide initiator, a dialkyl peroxide initiator, a peroxyester initiator, a percarbonate initiator and a peroxyketal initiator.

Specific examples of the radical polymerization initiator include azo compounds such as 1,1'-azobis(cyclohexane-1-carbonitrile), 2,2'-azobis(2,4,4-trimethylpentene), 2,2'-azobis(2-methylpropane), 2-cyano-2 propylazoformamide, 2,2'-azobis(2-hydroxy-methylpropionate), 2,2'-azobis(2-methylbutyronitrile), 2,2'-azobisisobutyronitrile, 2,2'-azobis[2-(2-imidazoline-2-yl)propane] and dimethyl 2,2'-azobis(2-methyl propionate).

Specific examples of the diacyl peroxide initiator and the dialkyl peroxide initiator include dicumyl peroxide, tert-butyl cumyl peroxide, di-tert-butyl peroxide, benzoyl peroxide and lauroyl peroxide.

Specific examples of the peroxyester initiator include tert-butyl peroxy-3,3,5-trimethylhexanoate, tert-butyl peroxylaurate, tert-butyl peroxyisobutyrate, tert-butyl peroxyacetate, di-tert-butyl peroxyhexahydroterephthalate, di-tert-butyl peroxyazelate, tert-butyl peroxy-2-ethylhexanoate, 1,1,3,3-tetramethylbutyl peroxy-2 ethylhexanoate and tert-amylperoxy-2 ethylhexanoate.

Specific examples of the percarbonate initiator include tert-butylperoxyallyl carbonate and tert-butylperoxyisopropyl carbonate.

Specific examples of the peroxyketal initiator include 1,1-di-tert-butylperoxycyclohexane, 1,1-di-tert-butylperoxy-3,3,5-trimethylcyclohexane and 1,1-di-tert-hexylperoxy-3,3,5-trimethylcyclohexane.

In the composition of the present embodiment, these examples of the polymerization initiator may be used singly, or in combination of two or more kinds thereof.

The content of polymerization initiator in the composition of the present embodiment is, for example, 0.01 parts by mass to 5 parts by mass when the total amount of the composition is 100 parts by mass.

(iv) Ultraviolet Absorber

The composition of the present embodiment may contain an ultraviolet absorber in order to further improve weather resistance of the polymethyl methacrylate to be produced and a molded body thereof.

Preferred examples of the ultraviolet absorber which may be contained in the composition of the present embodiment include benzophenone ultraviolet absorbers, cyanoacrylate ultraviolet absorbers, benzotriazole ultraviolet absorbers, malonic acid ester ultraviolet absorbers and oxalanilide ultraviolet absorbers.

Specific examples of the ultraviolet absorber include 2-(2'-hydroxy-5'-methylphenyl)benzotriazole, 2-hydroxy-4-n-octylbenzophenone and 2-(3-tert-butyl-2-hydroxy-5-methylphenyl)-5-chlorobenzotriazole, 2-(2-hydroxy-3,5-di-tert-pentylphenyl)benzotriazole and 2,4-di-tert-butylphenyl-3,5-di-tert-butyl-4-hydroxybenzoate.

In the composition of the present embodiment, these examples of the ultraviolet absorber may be used singly, or in combination of two or more kinds thereof.

The content of ultraviolet absorber in the composition of the present embodiment is, for example, 0.001 parts by mass to 1 part by mass when the total amount of the composition is 100 parts by mass.

(v) Colorant

The composition of the present embodiment may contain a colorant in order to turn polymethyl methacrylate to be produced and a molded body thereof into any suitable color.

Preferred examples of the colorant which may be contained in the composition of the present embodiment include perylene dyes, perinone dyes, pyrazolone dyes, methine dyes, coumarin dyes, quinophthalone dyes, quinoline dyes, anthraquinone dyes (for example: Sumiplast Violet B), anthrapyridone dyes, thioindigo dyes, isoindolinone pigments, diketopyrrolopyrrole pigments, condensed azo pigments, benzimidazolone pigments, dioxazine pigments, copper phthalocyanine pigments and quinacridone pigments.

These examples of the colorant may be used singly, or in combination of two or more kinds thereof.

The content of colorant in the composition of the present embodiment is, for example, $1.0 \times 10^{-8}$ parts by mass to 0.001 parts by mass when the total amount of the composition is 100 parts by mass.

The composition of the present embodiment is usually in the form of a solution but is not limited thereto.

In the composition of the present embodiment, a ratio of the concentration of methyl acrylate to the concentration of methyl isobutyrate (concentration of methyl acrylate/concentration of methyl isobutyrate) is preferably 0.1 to 6.0 and more preferably 0.1 to 4.0.

When a ratio of the concentration of methyl acrylate to the concentration of methyl isobutyrate is within the above range, it is possible to efficiently prevent or suppress time-dependent property deterioration of a polymer and a molded body thereof which is attributed particularly from heat. For example, it is possible to efficiently prevent or suppress an increase in yellowness index and a decrease in light transmittance.

In the composition of the present embodiment, a ratio of the concentration of methyl propionate to the concentration of methyl isobutyrate (concentration of methyl propionate/concentration of methyl isobutyrate) is preferably 1.0 to 4.0 and more preferably 1.0 to 3.0.

When a ratio of the concentration of methyl propionate to the concentration of methyl isobutyrate is within the above range, it is possible to efficiently prevent or suppress time-dependent deterioration of a polymer and a molded body thereof which is attributed particularly from heat. For example, it is possible to efficiently prevent or suppress an increase in yellowness index and a decrease in light transmittance.

2. Method of Producing Composition

The composition of the present embodiment can be produced by mixing the aforementioned components under any suitable conditions by any suitable conventionally-known method.

Specifically, the composition can be produced by preparing the above components in a predetermined amount and mixing the components in a mixing tank controlled at a definite temperature with a jacket or the like.

In this manner, according to the method of producing a composition of the present embodiment, without large facilities, it is possible to easily produce a low-cost composition that enables production of a polymer (molded body) having the aforementioned excellent properties.

3. Method of Producing Polymethyl Methacrylate (Polymer) and Molded Body Thereof A method of polymerizing the composition of the present embodiment is not particularly limited. The composition can be polymerized by any suitable method selected in consideration of components contained in the composition and amounts of the components. Examples of the method of polymerizing the composition of the present embodiment include bulk polymerization, solution polymerization, suspension polymerization and emulsion polymerization.

Specifically, for example, in cell cast polymerization which produces a sheet of polymethyl methacrylate from the composition by bulk polymerization, any suitable heat treatment can be performed on the composition under predetermined heating conditions to advance polymerization reactions. Accordingly, the composition is polymerized and cured, thereby obtaining a polymer.

A heating temperature and a heating time in the heating conditions can be set in consideration of, for example, types and amounts of the selected polymerization modifier, polymerization initiator and/or other components, the content of methyl methacrylate, and concentrations of methyl isobutyrate, methyl acrylate and methyl propionate.

In the present embodiment, in the cell cast polymerization, a heating temperature is set to, for example, 50° C. to 120° C. and a heating time can be set to, for example, one hour to 20 hours to produce a polymer and a molded body thereof.

The heat treatment in a method of producing a polymer and a molded body thereof of the present embodiment can involve a plurality of steps executed at different heating temperatures and/or heating times.

The polymer of the present embodiment and a molded body thereof can be produced by the heat treatment under heating conditions including, for example, the following Steps 1 to 7.

Step 1: Raise the temperature from room temperature to 72° C. over 30 minutes.

Step 2: Keep the temperature at 72° C. for 72 minutes.

Step 3: Lower the temperature from 72° C. to 68° C. over 18 minutes.

Step 4: Keep the temperature at 68° C. for 198 minutes.

Step 5: Raise the temperature from 68° C. to 120° C. over 36 minutes.

Step 6: Keep the temperature at 120° C. for 42 minutes.

Step 7: Lower the temperature from 120° C. to room temperature over 78 minutes.

In the method of producing a polymer and a molded body thereof of the present embodiment, Steps 1 to 7 in this order makes it possible to suppress heat generation during polymerization and to terminate the polymerization stably.

In the heat treatment of the composition of the present embodiment, for example, cell casting (cell cast polymerization) is employed using a cell that defines a predetermined-shaped sealed space inside the cell, thereby forming a molded body with a predetermined shape. Hereinafter, a method of producing a molded body by the cell casting will be described in detail.

In producing a molded body by the cell casting, first, a cell is prepared. Here, a sheet-shaped molded body (or may be referred to as "cast sheet") will be illustrated.

Such a cell includes at least two flat-plate members and a seal material (gasket) that is sandwiched between the two flat-plate members and can seal a gap, or a sealed space, between the two flat-plate members facing each other.

The flat-plate member may have the form of a sheet or belt. The flat-plate member includes a material that is not dissolved by the composition of the present embodiment, does not inhibit polymerization reactions, and has heat resistance enough to withstand the heating temperature during the heat treatment. Preferred examples of the material of the flat-plate member include glass and metals.

As the seal material, any conventionally-known suitable seal material may be used. The seal material includes a material that is not dissolved by the composition of the present embodiment, does not inhibit polymerization reactions, and has heat resistance enough to withstand the heating temperature during the heat treatment. A specific preferred example of the seal material is a vinyl chloride resin gasket.

Next, the composition of the present embodiment is injected into a gap defined by the cell prepared as described above by any conventionally-known suitable method.

Next, the cell is subjected to heat treatment under the above heating conditions. The heat treatment for the cell injected with the composition of the present embodiment not particularly limited. Similarly to conventionally-known cell casting, the heat treatment for the cell may be direct heat treatment from the outside of the cell using, for example, a hot air circulation furnace or an infrared heater. Alternatively, a suitable conventionally-known jacket may be provided outside the cell and a heat medium such as hot air, hot water, and water vapor may be introduced into the jacket.

4. Use of Polymer and Molded Body Thereof

A polymer of the composition of the present embodiment and a molded body thereof are excellent in light transparency, heat resistance, and weather resistance. Therefore, the present invention is suitable for various applications such as lighting equipment, vehicle parts, signage, and building materials which may be exposed to external environments and also to heat sources and light sources.

EXAMPLES

Hereinafter described are Examples according to the embodiment of the present invention. The present invention is not limited by the following Examples.

Preparation Example 1 of Methyl Methacrylate Product

Methacrylic acid and methanol were esterified inside a reactor to synthesize methyl methacrylate. After that, unreacted methanol was removed in an extraction column. Purification was repeated in a plurality of distillation columns, thereby preparing a methyl methacrylate product containing extremely high-purity methyl methacrylate.

The obtained methyl methacrylate product contained methyl isobutyrate (10.9 ppm by mass) and methyl acrylate (1.1 ppm by mass). The content of methyl methacrylate in the obtained methyl methacrylate product was 99.99% by mass.

Example 1

—Preparation of Composition 1

Methyl isobutyrate (Wako First Grade, manufactured by FUJIFILM Wako Pure Chemical Corporation) and methyl acrylate (manufactured by Tokyo Chemical Industry Co., Ltd.) were added to and mixed with the methyl methacrylate product prepared in Preparation Example 1, thereby preparing Composition 1. Composition 1 obtained was in the form of a solution.

The content of methyl methacrylate in Composition 1 obtained was 99.97% by mass. A concentration of methyl isobutyrate in Composition 1 was 40.9 ppm by mass, and a concentration of methyl acrylate in Composition 1 was 151.1 ppm by mass. The following Table 1 shows components of Composition 1.

A ratio of the concentration of methyl acrylate to the concentration of methyl isobutyrate in Composition 1 (concentration of methyl acrylate/concentration of methyl isobutyrate) was 3.7.

—Preparation of Composition 1'

Composition 1 (99.83 parts by mass) prepared as described above, sodium di-(2-ethylhexyl) sulfosuccinate (0.07 parts by mass) as a mold release agent, terpinolene (0.01 parts by mass) as a polymerization modifier, 2,2'-azobisisobutyronitrile (0.08 parts by mass) as a polymerization initiator, 2-(2'-hydroxy-5'-methylphenyl)benzotriazole (0.01 parts by mass) as an ultraviolet absorber, and Sumiplast Violet B ($7.5 \times 10^{-7}$ parts by mass) as a colorant were fed into a glass container and mixed to obtain Composition 1' for forming a molded body (cast sheet). Composition 1' obtained was in the form of a solution.

—Preparation of Cast Plate 1

A vinyl chloride resin gasket having a thickness of 3.8 mm was sandwiched between two glass plates facing each other so as to prepare a cell defining a gap sealed by the vinyl chloride resin gasket and the two glass plates. Composition 1' prepared as described above was injected into the gap inside the cell. The Composition 1'-injected cell was placed in an oven and subjected to heat treatment under heating conditions including the following Steps 1 to 7 in this order to polymerize methyl methacrylate, thereby preparing Cast sheet 1, a 250 mm-square molded body having a thickness of 3 mm.

(Heating Condition)

Step 1: Raise the temperature from room temperature to 72° C. over 30 minutes.

Step 2: Keep the temperature at 72° C. for 72 minutes.

Step 3: Lower the temperature from 72° C. to 68° C. over 18 minutes.

Step 4: Keep the temperature at 68° C. for 198 minutes.

Step 5: Raise the temperature from 68° C. to 120° C. over 36 minutes.

Step 6: Keep the temperature at 120° C. for 42 minutes.

Step 7: Lower the temperature from 120° C. to room temperature over 78 minutes.

—Preparation of Test Piece 1

Cast plate 1 prepared as described above was cut into a strip having a size of 25 cm in length×5 cm in width. The cut surface was grinded with a grinder (PLA-BEAUTY PB-500 manufactured by Megarotechnica Co., Ltd), thereby preparing Test piece 1.

—Evaluation of Test Piece 1

Using a spectrophotometer (U-4000 manufactured by Hitachi High-Tech Fielding Corporation), 25 cm pass transmittance of Test piece 1 obtained was measured in increments of 5 nm in a wavelength range of 380 to 780 nm, and then, the average of the measured values (25 cm pass Tt) was determined. From the measured 25 cm pass transmittance, XYZ values were determined using weighting factors for illuminant C according to the method described in JIS Z 8722, and then, a yellowness index (25 cm pass YI) was determined according to the method described in JIS K 7373. The following Table 2 shows the results.

Then, Test piece 1 was placed in an oven and subjected to heat treatment at a temperature of 100° C. for 100 hours. After that, Test piece 1 after the heat treatment was cooled to room temperature, and then, 25 cm pass transmittance (25 cm pass Tt) and a yellowness index (25 cm pass YI) were obtained by a method similar to the above method.

The following Table 2 shows the results.

Furthermore, ΔTt and ΔYI were calculated according to the following Formulae (1) and (2). The following Table 2 shows the results.

$$\Delta Tt = (25 \text{ cm pass } Tt \text{ after heat treatment}) - (25 \text{ cm pass } Tt \text{ before heat treatment}) \qquad (1)$$

$$\Delta YI = (25 \text{ cm pass } YI \text{ after heat treatment}) - (25 \text{ cm pass } YI \text{ before heat treatment}) \qquad (2)$$

Example 2

—Preparation of Composition 2

Methyl isobutyrate and methyl acrylate were added to and mixed with the methyl methacrylate product prepared in Preparation Example 1, thereby preparing Composition 2. Composition 2 obtained was in the form of a solution.

The content of methyl methacrylate in Composition 2 was 99.98% by mass. A concentration of methyl isobutyrate in Composition 2 was 40.9 ppm by mass, and a concentration of methyl acrylate in Composition 2 was 81.1 ppm by mass. The following Table 1 shows components of Composition 2.

A ratio of the concentration of methyl acrylate to the concentration of methyl isobutyrate in Composition 2 (concentration of methyl acrylate/concentration of methyl isobutyrate) was 2.0.

Composition 2' was prepared in a similar manner to Example 1 except that Composition 2 prepared in the above manner was used. After preparing Cast sheet 2 and Test piece 2, heat treatment was performed, and then, 25 cm pass Tt and 25 cm pass YI before and after the heat treatment were measured, followed by calculating ΔTt and ΔYI. Table 2 shows the results.

Example 3

—Preparation of Composition 3

Methyl isobutyrate and methyl acrylate were added to and mixed with the methyl methacrylate product prepared in Preparation Example 1, thereby preparing Composition 3. Composition 3 obtained was in the form of a solution.

The content of methyl methacrylate in Composition 3 obtained was 99.98% by mass. A concentration of methyl isobutyrate in Composition 3 was 40.9 ppm by mass, and a concentration of methyl acrylate in Composition 3 was 51.1 ppm by mass. The following Table 1 shows components of Composition 3.

A ratio of the concentration of methyl acrylate to the concentration of methyl isobutyrate in Composition 3 (concentration of methyl acrylate/concentration of methyl isobutyrate) was 1.2.

Composition 3' was prepared in a similar manner to Example 1 except that Composition 3 prepared in the above manner was used. After preparing Cast sheet 3 and Test piece 3, heat treatment was performed, and then, 25 cm pass Tt and 25 cm pass YI before and after the heat treatment were measured, followed by calculating ΔTt and ΔYI. The following Table 2 shows the results.

Example 4

—Preparation of Composition 4

Methyl isobutyrate and methyl acrylate were added to and mixed with the methyl methacrylate product prepared in Preparation Example 1, thereby preparing Composition 4. Composition 4 obtained was in the form of a solution.

The content of methyl methacrylate in Composition 4 obtained was 99.98% by mass. A concentration of methyl isobutyrate in Composition 4 was 110.9 ppm by mass, and a concentration of methyl acrylate in Composition 4 was 51.1 ppm by mass. The following Table 1 shows components of Composition 4.

A ratio of the concentration of methyl acrylate to the concentration of methyl isobutyrate in Composition 4 (concentration of methyl acrylate/concentration of methyl isobutyrate) was 0.5.

Composition 4' was prepared in a similar manner to Example 1 except that Composition 4 prepared in the above manner was used. After preparing Cast sheet 4 and Test piece 4, heat treatment was performed, and then, 25 cm pass Tt and 25 cm pass YI before and after the heat treatment were measured, followed by calculating ΔTt and ΔYI. The following Table 2 shows the results.

Example 5

—Preparation of Composition 5

Methyl isobutyrate and methyl acrylate were added to and mixed with the methyl methacrylate product prepared in Preparation Example 1, thereby preparing Composition 5. Composition 5 obtained was in the form of a solution.

The content of methyl methacrylate in Composition 5 obtained was 99.97% by mass. A concentration of methyl isobutyrate in Composition 5 was 210.9 ppm by mass, and a concentration of methyl acrylate in Composition 5 was 51.1 ppm by mass. The following Table 1 shows components of Composition 5.

A ratio of the concentration of methyl acrylate to the concentration of methyl isobutyrate in Composition 5 (concentration of methyl acrylate/concentration of methyl isobutyrate) was 0.2.

Composition 5' was prepared in a similar manner to Example 1 except that Composition 5 prepared in the above manner was used. After preparing Cast sheet 5 and Test piece 5, heat treatment was performed, and then, 25 cm pass Tt and 25 cm pass YI before and after the heat treatment were measured, followed by calculating ΔTt and ΔYI. The following Table 2 shows the results.

Example 6

—Preparation of Composition 6

Methyl isobutyrate, methyl acrylate, and methyl propionate (manufactured by Tokyo Chemical Industry Co., Ltd.) were added to and mixed with the methyl methacrylate product prepared in Preparation Example 1, thereby preparing Composition 6. Composition 6 obtained was in the form of a solution.

The content of methyl methacrylate in Composition 6 obtained was 99.98% by mass. A concentration of methyl isobutyrate in Composition 6 was 40.9 ppm by mass, a concentration of methyl acrylate in Composition 6 was 51.1 ppm by mass, and a concentration of methyl propionate in Composition 6 was 50.0 ppm by mass. The following Table 1 shows components of Composition 6.

A ratio of the concentration of methyl propionate to the concentration of methyl isobutyrate in Composition 6 (concentration of methyl propionate/concentration of methyl isobutyrate) was 1.2.

Composition 6' was prepared in a similar manner to Example 1 except that Composition 6 prepared in the above manner was used. After preparing Cast sheet 6 and Test piece 6, heat treatment was performed, and then, 25 cm pass Tt and 25 cm pass YI before and after the heat treatment were measured, followed by calculating ΔTt and ΔYI. The following Table 2 shows the results.

Example 7

—Preparation of Composition 7

Methyl isobutyrate, methyl acrylate, and methyl propionate were added to and mixed with the methyl methacrylate product prepared in Preparation Example 1, thereby preparing Composition 7. Composition 7 obtained was in the form of a solution.

The content of methyl methacrylate in Composition 7 obtained was 99.97% by mass. A concentration of methyl isobutyrate in Composition 7 was 40.9 ppm by mass, a concentration of methyl acrylate in Composition 7 was 51.1 ppm by mass, and a concentration of methyl propionate in Composition 7 was 100.0 ppm by mass. The following Table 1 shows components of Composition 7.

A ratio of the concentration of methyl propionate to the concentration of methyl isobutyrate in Composition 7 (concentration of methyl propionate/concentration of methyl isobutyrate) was 2.4.

Composition 7' was prepared in a similar manner to Example 1 except that Composition 7 prepared in the above manner was used. After preparing Cast sheet 7 and Test piece 7, heat treatment was performed, and then, 25 cm pass Tt and 25 cm pass YI before and after the heat treatment were measured, followed by calculating ΔTt and ΔYI. The following Table 2 shows the results.

Preparation Example 2 of Methyl Methacrylate Product

Methacrylic acid and methanol were esterified inside a reactor to synthesize methyl methacrylate. After that, unreacted methanol was removed in an extraction column. Purification was repeated in a plurality of distillation columns, thereby preparing a methyl methacrylate product containing methyl methacrylate as a main component. The obtained methyl methacrylate product contained methyl isobutyrate (6.6 ppm by mass) and methyl acrylate (2.2 ppm by mass). The content of methyl methacrylate in the obtained methyl methacrylate product was 99.99% by mass.

Comparative Example 1

—Preparation of Composition C1

Methyl isobutyrate was added to and mixed with the methyl methacrylate product prepared in Preparation Example 2, thereby preparing Composition C1. Composition C1 obtained was in the form of a solution.

The content of methyl methacrylate in Composition C1 obtained was 99.99% by mass. A concentration of methyl isobutyrate in Composition C1 was 36.6 ppm by mass, and a concentration of methyl acrylate in Composition C1 was 2.2 ppm by mass. The following Table 1 shows components of Composition C1.

A ratio of the concentration of methyl acrylate to the concentration of methyl isobutyrate in Composition C1 (concentration of methyl acrylate/concentration of methyl isobutyrate) was 0.06.

Composition C1' was prepared in a similar manner to Example 1 except that Composition C1 prepared in the above manner was used. After preparing Cast sheet C1 and Test piece C1, heat treatment was performed, and then, 25 cm pass Tt and 25 cm pass YI before and after the heat treatment were measured, followed by calculating ΔTt and ΔYI. The following Table 2 shows the results.

Comparative Example 2

—Preparation of Composition C2

Methyl isobutyrate was added to and mixed with the methyl methacrylate product prepared in Preparation Example 2, thereby preparing Composition C2. Composition C2 obtained was in the form of a solution.

The content of methyl methacrylate in Composition C2 obtained was 99.98% by mass. A concentration of methyl isobutyrate in Composition C2 was 106.6 ppm by mass, and a concentration of methyl acrylate in Composition C2 was 2.2 ppm by mass. The following Table 1 shows components of Composition C2.

A ratio of the concentration of methyl acrylate to the concentration of methyl isobutyrate in Composition C2 (concentration of methyl acrylate/concentration of methyl isobutyrate) was 0.02.

Composition C2' was prepared in a similar manner to Example 1 except that Composition C2 prepared in the above manner was used. After preparing Cast sheet C2 and Test piece C2, heat treatment was performed, and then, 25 cm pass Tt and 25 cm pass YI before and after the heat treatment were measured, followed by calculating ΔTt and ΔYI. The following Table 2 shows the results.

TABLE 1

| | Component | | | |
| --- | --- | --- | --- | --- |
| | Methyl methacrylate | Methyl isobutyrate | Methyl acrylate | Methyl propionate |
| Example 1 (Composition 1) | 99.97% by mass | 40.9 ppm by mass | 151.1 ppm by mass | 0.0 ppm by mass |
| Example 2 (Composition 2) | 99.98% by mass | 40.9 ppm by mass | 81.1 ppm by mass | 0.0 ppm by mass |
| Example 3 (Composition 3) | 99.98% by mass | 40.9 ppm by mass | 51.1 ppm by mass | 0.0 ppm by mass |
| Example 4 (Composition 4) | 99.98% by mass | 110.9 ppm by mass | 51.1 ppm by mass | 0.0 ppm by mass |
| Example 5 (Composition 5) | 99.97% by mass | 210.9 ppm by mass | 51.1 ppm by mass | 0.0 ppm by mass |
| Example 6 (Composition 6) | 99.98% by mass | 40.9 ppm by mass | 51.1 ppm by mass | 50.0 ppm by mass |
| Example 7 (Composition 7) | 99.97% by mass | 40.9 ppm by mass | 51.1 ppm by mass | 100.0 ppm by mass |
| Comparative Example 1 (Composition C1) | 99.99% by mass | 36.6 ppm by mass | 2.2 ppm by mass | 0.0 ppm by mass |
| Comparative Example 2 (Composition C2) | 99.98% by mass | 106.6 ppm by mass | 2.2 ppm by mass | 0.0 ppm by mass |

TABLE 2

| | Before heat treatment | | After heat treatment | | Δ | |
| --- | --- | --- | --- | --- | --- | --- |
| | 25 cmTt | 25 cmYI | 25 cmTt | 25 cmYI | ΔTt | ΔYI |
| Example 1 | 70.4 | 1.2 | 70.6 | 3.3 | 0.2 | 2.1 |
| Example 2 | 70.0 | 1.6 | 70.0 | 3.5 | 0.0 | 1.9 |
| Example 3 | 73.7 | 1.4 | 72.6 | 6.9 | −1.1 | 5.5 |
| Example 4 | 70.9 | 1.5 | 69.8 | 6.7 | −1.1 | 5.2 |
| Example 5 | 70.4 | 1.4 | 68.6 | 7.9 | −1.8 | 6.5 |
| Example 6 | 73.2 | 1.4 | 72.6 | 4.8 | −0.6 | 3.4 |
| Example 7 | 71.5 | 1.4 | 71.9 | 2.8 | 0.4 | 1.4 |

TABLE 2-continued

|  | Before heat treatment | | After heat treatment | | Δ | |
|---|---|---|---|---|---|---|
|  | 25 cmTt | 25 cmYI | 25 cmTt | 25 cmYI | ΔTt | ΔYI |
| Comparative Example 1 | 76.7 | 0.9 | 70.1 | 11.1 | −6.6 | 10.2 |
| Comparative Example 2 | 75.1 | 1.1 | 69.0 | 9.6 | −6.1 | 8.5 |

What is claimed is:

1. A composition comprising methyl methacrylate, methyl isobutyrate and methyl acrylate, wherein
   a content of methyl methacrylate is 99.5% by mass or more,
   a concentration of methyl isobutyrate is 20 ppm by mass to 300 ppm by mass, and
   a concentration of methyl acrylate is 5 ppm by mass to 200 ppm by mass.

2. The composition according to claim 1, wherein the concentration of methyl isobutyrate is 20 ppm by mass to 140 ppm by mass.

3. The composition according to claim 1, wherein the concentration of methyl acrylate is 20 ppm by mass to 200 ppm by mass.

4. The composition according to claim 1, wherein a ratio of the concentration of methyl acrylate to the concentration of methyl isobutyrate is 0.1 to 6.0.

5. The composition according to claim 1, wherein the composition further comprises methyl propionate, and wherein a concentration of methyl propionate is 5 ppm by mass to 200 ppm by mass.

6. The composition according to claim 5, wherein the concentration of methyl propionate is 20 ppm by mass to 200 ppm by mass.

7. The composition according to claim 5, wherein a ratio of the concentration of methyl propionate to the concentration of methyl isobutyrate is 1.0 to 4.0.

8. A method for producing a polymer, the method comprising polymerizing the composition according to claim 1.

* * * * *